United States Patent [19]
Kiyohara et al.

[11] 3,846,805
[45] Nov. 5, 1974

[54] EXPOSURE CONTROL CIRCUIT STRUCTURE

[75] Inventors: Takehiko Kiyohara, Zama; Tetsuya Taguchi, Kawasaki, both of Japan

[73] Assignee: Canon Kabashiki Kaisha, Tokyo, Japan

[22] Filed: Jan. 23, 1974

[21] Appl. No.: 435,774

[30] Foreign Application Priority Data
Feb. 6, 1973   Japan.................. 48-15016

[52] U.S. Cl..................... 354/23, 354/60, 354/152, 354/219, 354/288
[51] Int. Cl..................... G03b 13/02, G03b 17/12
[58] Field of Search.......... 354/23, 31, 60, 22, 152, 354/154, 202, 219, 224, 225, 288

[56] References Cited
UNITED STATES PATENTS

| | | | |
|---|---|---|---|
| 3,324,776 | 6/1967 | Natsumoh | 354/23 |
| 3,511,155 | 5/1970 | Yamada | 354/60 X |
| 3,603,200 | 9/1971 | Hirumo | 354/225 |
| 3,670,639 | 6/1972 | Hamden, Jr. | 354/60 X |

*Primary Examiner*—Joseph F. Peters, Jr.
*Attorney, Agent, or Firm*—Fitzpatrick, Cella, Harper & Scinto

[57] ABSTRACT

In a camera having a TTL metering system, an exposure control circuit structure includes a flexible substrate, an electric circuit printed on the substrate and at least one light-receiving element provided on the substrate and connected to the circuit. The circuit structure may be bent along an optical element of the camera.

5 Claims, 2 Drawing Figures

PATENTED NOV 5 1974    3,846,805

EXPOSURE CONTROL CIRCUIT STRUCTURE

BACKGROUND OF THE INVENTION

1. Field of the Invention

This invention relates to a photographic camera, and more particularly to an exposure control circuit structure for the camera.

2. Description of the Prior Art

In the single-lens reflex cameras having a so-called TTL type exposure control system whereby metering is effected through the photographic lens, the light-receiving element has heretofore been mounted on one of various locations such as the back side of the viewfinder's movable mirror, the outlet port for a split beam obtained through a beam splitter provided in the viewfinder's optical system, the back side of the reflecting surface of the pentaprism or the like, and the neighborhood of the viewfinder's eyepiece.

As the means whereby the output of the light-receiving element so mounted in one of the various manners is taken out through an electric circuit to provide an indication of exposure conditions or operate the exposure control mechanism, it has been put into practice to incorporate, into a camera, an electric circuit structure for operating such devices as the shutter time control, the lens aperture control for a strobo of controlled luminescence, etc.

These various electric control circuits have been constructed by any suitable combination of various circuits such as a circuit for amplifying, compressing, storing or expanding the output of the light-receiving element responsive to the object brightness within the range of the order of EV–3 to EV–18 and for operating the shutter time signal, the aperture signal, the film sensitivity signal, etc., a temperature compensation and voltage stabilization circuit, an exposure control circuit for operating the shutter drive and aperture control mechanisms, a luminescence control circuit for controlling the luminescence of the strobo in accordance with the object distance, a flash control circuit for controlling the aperture in accordance with flash light and the object distance.

Such electric control circuit has heretofore comprised an electric circuit with transistors as main components, or an electric circuit including a hybrid or a monolithic IC, and more recently, the circuit structure has been in the tendency toward a smaller size as a result of the advance of the IC technique, until it has become possible to incorporate condiderably complicated electric circuits into existing cameras without reforming the cameras in size and appearance.

With regard to the light-receiving element, however, the location to be assumed by the element within the camera depends on the size of the element and other factors. Further, various adjusting members and change-over switches employed in the electric circuit must be incorporated into a camera as individual parts and their locations in the camera have effects on the functional stability of failure rate of the circuit.

SUMMARY OF THE INVENTION

It is an object of the present invention to provide an exposure control circuit structure in which main components of the electric control circuit such as integrated circuit, adjusting resistors and change-over switches are all disposed on a single substrate of flexible insulating material and which may be bent along and disposed on non-functional faces of an optical element such as pentaprism, mirror, beam splitter or the like which forms a part of the camera's viewfinder system.

Such circuit structure is useful to provide effective utilization of the interior space within the camera, to shorten the electrical connection and to reduce the assembling and working procedures for the circuit. The shortened connections between the elements are effective to decrease the stray electrostatic capacity and thereby provide a stable circuit operation.

The invention will become more fully apparent from the following detailed description thereof taken in conjunction with the accompanying drawings.

BRIEF DESCRIPTION OF THE DRAWINGS

FIG. 2 is a perspective view showing an assembly of the substrate of FIG. 1 and individual elements attached thereto the assembly being disposed on and along non-functional faces of an optical element such as pentaprism or the like.

DESCRIPTION OF THE PREFERRED EMBODIMENTS

Figure 1:
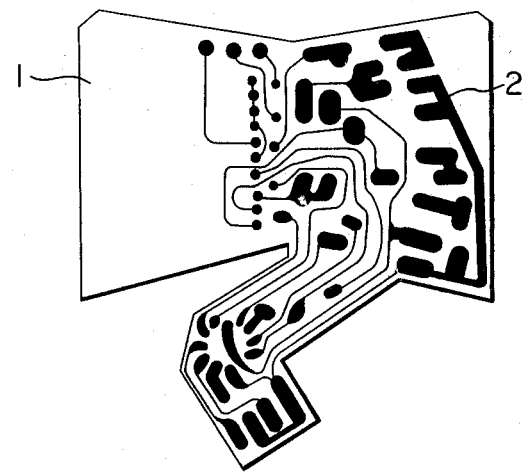
FIG. 1 is an developed plan view of a substrate employed in the electric control circuit structure according to the present invention.
Figure 2:
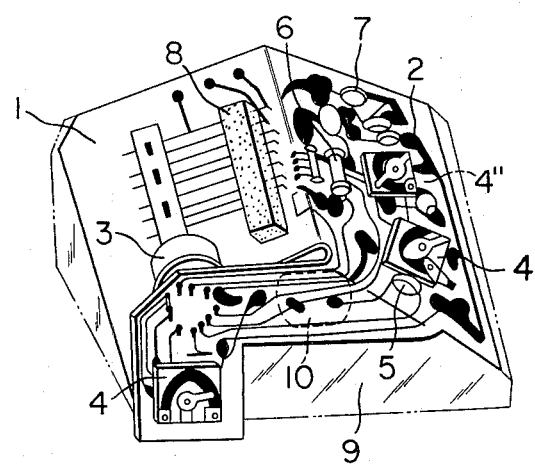

Referring to the drawings, a wiring print substrate is designated by reference numerals 1 and has a configuration similar, for example, to that of non-functional faces of a pentaprism when developed. The substrate includes a black patterned section of electrical conductor which is a print wiring portion formed as by photoetching a foil of metal such as copper or the like. There is further shown an integrated circuit 3, adjusting variable resistors 4, 4' and 4'', resistance elements 5 and 7, a capacitor 6, change-over switches 8, a pentaprism 9 and a light-receiving element 10. In the shown embodiment, the light-receiving element 10 is disposed in intimate contact with the rear face of the pentaprism 9 and adjacent to the integrated circuit 3, and it has a good TTL metering performance. Therefore, even if there is formed a high impedance circuit, a reliable operation may be achieved without the circuit suffering from any unstability which would otherwise result from stray coupling or the like. Those individual parts such as adjusting resistors 4, 4', 4'' and others are mounted in contact with the substrate 1 and the terminals of the various switches 8 may also be provided directly on the substrate, and this contributes to minimization of the thickness of the circuit structure, with in turn leads to effective utilization of the interior space within a camera.

Thus, the electric control circuit structure of the present invention is flexibly and monolithically disposed along the non-functional faces of an optical element disposed adjacent to at least one photoelectric element and, in addition to a high TTL metering performance, such circuit structure enjoys a high accuracy and reliability as an electric control circuit. Moreover, the circuit structure of the present invention contributes to effective utilization of the interior space of the camera and to reduction in the assembling and working procedures. This means a great advantage in the manufacture of cameras.

We claim:

1. An exposure control circuit structure for a photographic camera comprising a flexible print substrate, an electric circuit printed on said substrate, and at least one photoelectric element provided on said substrate and connected to said electric circuit, said print substrate being disposed on and along non-functional faces of an optical element in the viewfinder's optical system of the camera.

2. A circuit structure according to claim 1, further comprising an integrated circuit and adjusting resistors.

3. A circuit structure according to claim 1, further comprising a capacitor.

4. A circuit structure according to claim 1, wherein said optical element is a pentaprism and said circuit structure is bent along and disposed on the roof of said pentaprism.

5. A circuit structure according to claim 1, wherein said photoelectric element is disposed adjacent to the viewfinder's eyepiece of the camera.

* * * * *